Figure 1:
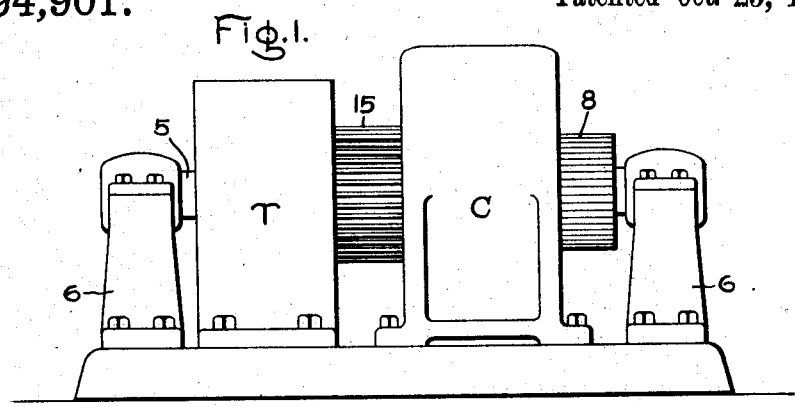

H. M. HOBART.
ELECTRICITY TRANSFORMER AND TRANSFORMING AND CONVERTING APPARATUS.
APPLICATION FILED SEPT. 4, 1917.

1,394,901.

Patented Oct. 25, 1921.

Inventor:
Henry M. Hobart,
by Albert G. Davis
His Attorney.

UNITED STATES PATENT OFFICE.

HENRY M. HOBART, OF SCHENECTADY, NEW YORK, ASSIGNOR TO GENERAL ELECTRIC COMPANY, A CORPORATION OF NEW YORK.

ELECTRICITY TRANSFORMER AND TRANSFORMING AND CONVERTING APPARATUS.

1,394,901. Specification of Letters Patent. Patented Oct. 25, 1921.

Application filed September 4, 1917. Serial No. 189,504.

*To all whom it may concern:*

Be it known that I, HENRY M. HOBART, a citizen of the United States, residing at Schenectady, county of Schenectady, State of New York, have invented certain new and useful Improvements in Electricity Transformers and Transforming and Converting Apparatus, of which the following is a specification.

My present invention relates to electricity transformers and electricity transforming and converting apparatus. In its broadest aspect, the invention relates to electricity transformers having primary and secondary windings one of which is stationary and the other rotatable, and the object of the invention in this connection is to provide such a transformer with an improved magnetic circuit of laminated material. More generally, the invention relates to electricity transforming and converting apparatus in which the converting means has a rotatable element arranged to rotate as a unit with the secondary winding of a transformer, and the object of the invention in this connection is to provide an improved electricity transforming and converting apparatus of this type.

The construction of a satisfactory laminated magnetic core for a transformer in which one winding is stationary and the other rotatable involves certain difficulties on account of the peculiar locus of the magnetic circuit for the transformer flux interlinked with both primary and secondary windings. I have discovered that such a transformer may be very conveniently provided with a cylindrical magnetic core having a magnetic circuit of relatively low magnetic reluctance in substantially four different planes by employing radially disposed annular laminations in combination with laminations bent in the form of involutes and assembled as solid annular core members magnetically in contact with the outer and inner cylindrical surfaces of the core member made up of the radially disposed annular laminations. The improved transformer construction of my present invention is particularly adapted to be employed in electricity transforming and converting apparatus of the type described in the copending application for Letters Patent of the United States filed on Sept. 6, 1916, on behalf of Charles W. Stone and myself, Ser. No. 118,635. In the electricity transforming and converting apparatus of this application a polyphase step-down transformer is mounted on the rotatable shaft of a converting or rectifying device, such, for example, as a synchronous converter. If the primary winding of the step-down transformer rotates, slip rings must be provided for connecting this winding to the high tension alternating current supply system, and for this reason it is very desirable to construct the transformer with a stationary primary winding and a rotatable secondary winding. The chief difficulty of such an arrangement is the provision of a satisfactory polyphase transformer of this type. One of the principal aims of the present invention is then to provide an improved electricity transforming and converting apparatus comprising a transformer having a polyphase primary winding carried on a laminated stationary core and a polyphase secondary winding carried on a laminated rotary core mounted on the same shaft as the rotatable element of the converting or rectifying device of the apparatus.

The novel features of the invention which I believe to be patentable are definitely set forth in the appended claims. These features together with the construction and mode of operation of apparatus embodying the same will be understood from the following description taken in conjunction with the accompanying drawings in which—

Figure 2:
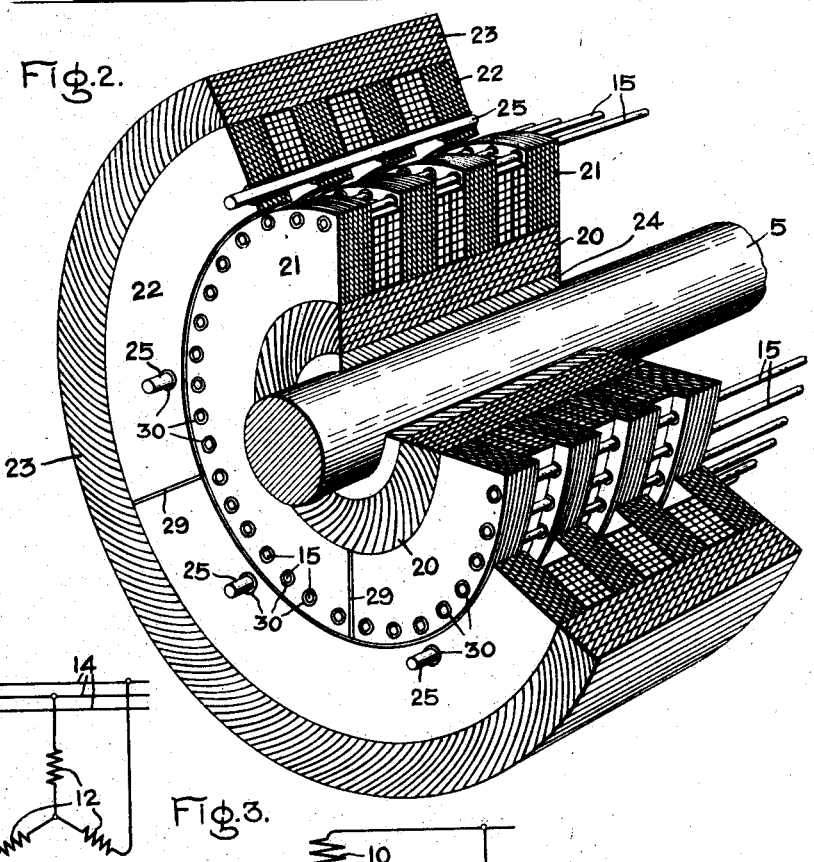
Figure 3:
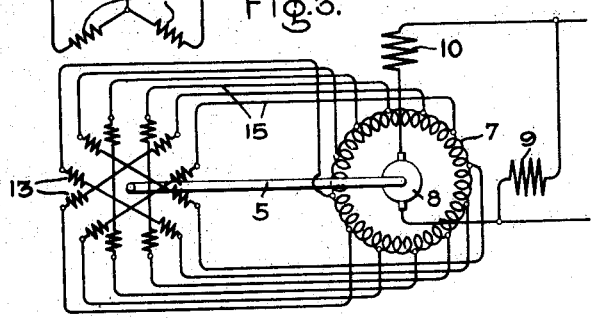

Figure 1 is an elevation of an electricity transforming and converting apparatus embodying the present invention; Fig. 2 is a perspective view, partly in section, of the step-down transformer of the apparatus; and Fig. 3 is a diagram of the electrical connections of the apparatus.

The electricity transforming and converting apparatus illustrated in the accompanying drawings comprises a shaft 5 rotatably mounted in suitable bearings 6. The apparatus consists essentially of two elements, first, a step-down transformer T, and, second, a converting or rectifying device, such, for example, as a synchronous converter C. The converter C may be of the usual type, and as illustrated in the accompanying drawings has a rotary armature winding 7 connected to the segments of a commutator 8 and a stationary exciting winding 9 and a stationary interpole winding 10. The magnetic core carrying the armature winding 7 is mounted on the rotatable shaft 5.

The step-down transformer T has a polyphase primary winding 12 arranged on a stationary magnetic core and a polyphase secondary winding 13 arranged concentrically with respect to the primary winding but mounted on a rotary magnetic core. Both cores of the transformer are made of laminated magnetic material, and the rotary core is mounted on the shaft 5. The primary winding 12 is electrically connected to the high tension alternating current supply mains 14. This source of alternating current as represented in the drawings is three phase and the primary winding 12 is illustrated as star-connected, although it will of course be understood that the primary winding may be connected in any suitable manner. The secondary winding 13 comprises six coils whose twelve terminals are arranged to form in effect a twelve phase secondary winding, as diagrammatically and vectorially represented in Fig. 3 of the drawings. Each pair of poles of the armature 7 of the converter has twelve taps which are connected by the connectors 15 to the twelve terminals of the secondary winding 13.

The magnetic structure or core of the improved transformer construction of my present invention is made up of four different sets of laminations assembled to form four concentric annular core members. The inner two sets of laminations 20 and 21 constitute the rotatable core and the outer two sets of laminations 22 and 23 constitute the stationary core of the transformer. The laminations 20 extend longitudinally from end to end of the transformer. These laminations are spiraled or curved so as to form a solid annular ring. The arrangement of these laminations will be clearly understood by reference to Fig. 2 of the drawings. It will be noted that each lamination is bent in the form of an involute, whereby the circumferential cross-section of each lamination gradually increases from its inner end. This type of lamination enables me to provide a path of low magnetic reluctance parallel to the axis of the shaft 5 and at the same time to provide a solid magnetic structure or core member. The laminations 20 are conveniently assembled on a tubular sleeve 24 forced onto or otherwise suitably secured to the shaft 5.

The laminations 21 are annular in shape and are radially disposed, that is to say arranged in a plane perpendicular to the axis of the shaft 5, and are divided into four groups or bundles mounted on the laminations 20 and suitably spaced to form three winding windows in which the six coils of the secondary winding 13 are positioned. It will be noted that the bottom of each winding window is formed by the outer cylindrical surface of the laminations 20 and the two sides are formed by the two adjacent bundles of the laminations 21. The two secondary coils of the same phase are placed in the same winding window and the terminals of these coils are suitably connected to the connectors 15. The connectors 15 are in the form of cylindrical rods extending through insulated holes near the outer surface of the laminations 21. The connectors are so positioned as to form holding members for the coils of the secondary winding thereby firmly securing these coils in position.

The laminations 22 are similar to the laminations 21 and are arranged in four groups to provide the three winding windows for the three coils of the primary winding 12. The primary winding coils are held in position by metallic rods 25, three of which are electrically connected to the three terminals of the primary winding and serve as connectors to the external supply mains. The laminations 23 are bent in the form of involutes just as in the case of the laminations 20, and are mounted on the laminations 22 as clearly illustrated in Fig. 2 of the drawings. The connectors 15 and rods 25 are insulated from the core members 21 and 22, respectively, and to this end are preferably covered by insulating sleeves or tubes 30. The radially disposed annular laminations 21 and 22 should not provide a complete circumferential metallic path for induced currents, and for this reason each annular lamination has a radial cut or slit 29 to interrupt its continuity. In assembling the laminations, the slits 29 are staggered in the well understood manner. It will of course be understood that the laminations 21 and 22 may have more than one radial slit 29, in which case the laminations will consist of segments assembled to form complete rings.

It will be evident from the foregoing description that I have provided a transformer having a laminated magnetic core of low reluctance arranged so that the secondary winding of the transformer is rotatable while the primary winding is stationary. The magnetic circuit for the flux interlinked with both primary and secondary windings is of low reluctance due to the combined arrangement of radially and longitudinally positioned laminations. The solid annular core members 20 and 23 of involute laminations provide paths for the magnetic flux parallel to the axis of the shaft 5, while the radially disposed annular laminations 21 and 22 provide paths for the flux in planes perpendicular to the axis of the shaft 5. The entire magnetic core of the transformer may be considered as composed of radially disposed annular laminations, in which there is a circumferential air gap, and solid annular magnetic members made up of involute laminations for completing the magnetic circuit at the inner and outer cylindrical surfaces of the radially disposed laminations. By this arrangement the complete path for the magnetic flux lies in substantially four planes, two of which are parallel radial planes perpendicular to the axis of the shaft and the other two connect these parallel paths and extend longitudinally or in the same direction as the shaft.

The synchronous converter C is diagramatically represented in Fig. 3 as bi-polar, but it will of course be understood that the representation is purely for explanation purposes, since the converter will usually have more than two poles. The particular transformer shown in Fig. 2 is designed to be connected to a six-pole converter and to have twelve taps per pair of poles between the secondary winding 13 and the armature winding 7. There are thus $12 \times \frac{6}{2} = 36$ connectors 15. These 36 connectors are connected to 36 equidistant points of the armature winding 7 in the well understood manner. At the transformer end, the connectors 15 are connected in groups of three equidistant connectors to the twelve terminals of the secondary winding 13.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is—

1. A transformer comprising in combination, a two-part magnetic core one part of which is stationary and the other part rotatable, each part of said magnetic core being composed of a plurality of laminations of involute form assembled as a substantially solid annular member and a plurality of annular laminations positioned in a plane perpendicular to the axis of said annular member and assembled in groups to form with said annular member a plurality of winding windows, a polyphase primary winding assembled in the winding windows of one of the parts of said core, and a polyphase secondary winding assembled in the winding windows of the other part of said core.

2. A transformer comprising in combination, a two-part magnetic core one part of which is stationary and the other part rotatable, a rotatably mounted shaft upon which the rotatable part of said core is carried, the rotatable part of said core being composed of a plurality of laminations of involute form assembled about said shaft as a substantially solid annular member and a plurality of radially disposed annular laminations mounted on the outer cylindrical surface of said annular member and arranged in groups to form with the annular member a plurality of winding windows, the stationary part of said core being arranged around said rotatable part and separated therefrom by a small air gap and being provided with winding windows, a polyphase primary winding assembled in the winding windows of one of the parts of said core, and a polyphase secondary winding assembled in the winding windows of the other part of said core.

3. A transformer comprising in combination, a two-part magnetic core one part of which is rotatable and the other part stationary, a rotatably mounted shaft upon which the rotatable part of said core is carried, the rotatable part of said core comprising a plurality of laminations bent in the form of involutes and assembled on said shaft to form a substantially solid annular member and a plurality of radially disposed annular laminations mounted on the outer cylindrical surface of said annular member and arranged in groups to form therewith a plurality of winding windows, the stationary part of said core comprising a plurality of radially disposed annular laminations surrounding the rotatable part of said core and separated therefrom by a small air gap and spaced apart in groups to form winding windows and a plurality of laminations of involute form assembled as a solid annular member surrounding the annular laminations of this part and closing the winding windows therein, a polyphase primary winding assembled in the winding windows of one of the parts of said core, and a polyphase secondary winding assembled in the winding windows of the other part of said core.

4. A transformer comprising in combination, a magnetic core made up of a plurality of annular laminations spaced apart in groups to provide circumferential winding windows and forming an annular core member having inner and outer cylindrical surfaces, two solid annular core members made up of a plurality of laminations bent in the form of involutes arranged in contact with the inner and outer cylindrical surfaces of the annular core member made up of said annular laminations and adapted to complete the magnetic circuit at the outer and inner surfaces thereof, and windings assembled in said winding windows.

5. A transformer comprising in combination, a magnetic core made up of a plurality of annular laminations spaced apart in groups to provide circumferential winding windows and forming an annular core member having an inner cylindrical surface, a solid annular core member made up of a plurality of laminations bent in the form of involutes arranged in contact with the inner cylindrical surface of the annular core member made up of said annular laminations and adapted to complete the magnetic circuit at the inner surface thereof, magnetic material for completing the magnetic circuit at the outer surface of the annular core member made up of said annular laminations, and windings assembled in said winding windows.

6. A transformer comprising in combination, a rotatably mounted shaft, a magnetic core made up of a plurality of annular laminations spaced apart in groups to provide circumferential winding windows and forming an annular core member, said annular core member having a circumferential air gap dividing the member into two parts, a solid annular core member made up of a plurality of laminations bent in the form of involutes assembled on said shaft and arranged in contact with the inner cylindrical surface of the annular core member made up of said annular laminations and adapted to complete the magnetic circuit at the inside thereof, a stationary magnetic core member surrounding the outer part of said annular core member and secured thereto and arranged to complete the magnetic circuit at the outer surface of the annular core member, and windings assembled in said winding windows.

In witness whereof, I have hereunto set my hand this first day of September 1917.

HENRY M. HOBART.